(12) United States Patent
Stroup et al.

(10) Patent No.: US 7,501,037 B2
(45) Date of Patent: Mar. 10, 2009

(54) METHODS AND SYSTEMS FOR THE AUTOMATED MANUFACTURE OF COMPOSITE DOORS

(75) Inventors: Jon Christopher Stroup, Klamath Falls, OR (US); David Patrick Dailey, Sunbury, PA (US); John Robert Walter, Mifflinburg, PA (US); Thomas Scott Reich, Sunbury, PA (US); Mark John Strocko, Elysburg, PA (US); Randy Jon Clark, Klamath Falls, OR (US); Brent David Olson, Klamath Falls, OR (US)

(73) Assignee: JELD-WEN, inc., Klamath Falls, OR (US)

( * ) Notice: Subject to any disclaimer, the term of this patent is extended or adjusted under 35 U.S.C. 154(b) by 67 days.

(21) Appl. No.: 10/882,785

(22) Filed: Jul. 1, 2004

(65) Prior Publication Data
US 2005/0028921 A1 Feb. 10, 2005

Related U.S. Application Data

(60) Provisional application No. 60/483,980, filed on Jul. 1, 2003.

(51) Int. Cl.
*B32B 37/18* (2006.01)
*B32B 38/10* (2006.01)
(52) U.S. Cl. .................. 156/267; 156/250; 156/292; 156/300
(58) Field of Classification Search .............. 156/250, 156/267, 292, 300
See application file for complete search history.

(56) References Cited

U.S. PATENT DOCUMENTS

| 619,676 | A | 2/1899 | Cronin |
| 670,939 | A | 4/1901 | Rapp |
| 877,922 | A | 2/1908 | Gager |
| 1,183,842 | A | 5/1916 | Alling |
| 2,178,729 | A | 11/1939 | Shields |
| D132,040 | S | 4/1942 | Cummings |
| 2,343,740 | A | 3/1944 | Birmingham |
| 2,682,083 | A | 6/1954 | Patton |

(Continued)

FOREIGN PATENT DOCUMENTS

CA 57271 10/1986

(Continued)

OTHER PUBLICATIONS

Adhesives & Sealants Industry, "Forbo Adhesives," web page at http://www.adhesivesmag.com/CDA/ArticleInformation/products/BNPProductItem/0,2109..., as available via the Internet and printed Jun. 18, 2004.

(Continued)

*Primary Examiner*—Mark A Osele
(74) *Attorney, Agent, or Firm*—Nelson Mullins Riley & Scarborough, LLP

(57) ABSTRACT

Disclosed are automated processes and systems for the assembly of composite doors, and doors made using such processes and systems. The automated process may comprise a continuous series of steps allowing individual doors to be made in tandem, rather than in batch. The process may allow for the automation of individual steps such that the need for coordinating separate assembly steps may be substantially reduced.

26 Claims, 3 Drawing Sheets

U.S. PATENT DOCUMENTS

| | | |
|---|---|---|
| 2,797,450 A | 7/1957 | Ropella |
| 2,825,674 A | 3/1958 | Prase |
| 2,831,793 A | 4/1958 | Elmendorf |
| 3,098,781 A | 7/1963 | Greten |
| 3,121,263 A | 2/1964 | Binner |
| 3,212,948 A | 10/1965 | McMahon |
| 3,225,505 A | 12/1965 | Lytz |
| 3,308,013 A | 3/1967 | Bryant |
| 3,440,189 A | 4/1969 | Sharp et al. |
| 3,484,994 A | 12/1969 | Ashby et al. |
| 3,512,304 A | 5/1970 | Meuret |
| 3,533,190 A | 10/1970 | Hilfinger et al. |
| 3,546,841 A | 12/1970 | Smith et al. |
| 3,601,882 A * | 8/1971 | McRae .................... 29/407.1 |
| D222,775 S | 12/1971 | Sartori |
| 3,639,200 A | 2/1972 | Elmendorf et al. |
| 3,773,587 A | 11/1973 | Flewwelling |
| 3,793,125 A | 2/1974 | Kunz |
| 3,796,586 A | 3/1974 | Hanlon et al. |
| 3,824,058 A | 7/1974 | Axer et al. |
| 3,899,860 A | 8/1975 | Newell |
| 3,919,017 A | 11/1975 | Shoemaker et al. |
| 3,987,599 A | 10/1976 | Hines |
| 4,015,393 A | 4/1977 | Warwick |
| D244,736 S | 6/1977 | Palka |
| D245,824 S | 9/1977 | Palka |
| 4,072,558 A | 2/1978 | Akerson |
| 4,093,762 A * | 6/1978 | Kiefer ......................... 428/55 |
| 4,097,100 A * | 6/1978 | Sauder ................... 312/265.6 |
| 4,100,138 A | 7/1978 | Bilow et al. |
| 4,100,328 A | 7/1978 | Gallagher |
| 4,103,467 A | 8/1978 | Lindal |
| 4,104,828 A | 8/1978 | Naslund et al. |
| 4,142,007 A | 2/1979 | Lampe et al. |
| 4,146,662 A | 3/1979 | Eggers et al. |
| 4,183,187 A | 1/1980 | Simard |
| 4,236,365 A | 12/1980 | Wheeler |
| 4,246,310 A | 1/1981 | Hunt et al. |
| 4,248,163 A | 2/1981 | Caughey et al. |
| 4,268,565 A | 5/1981 | Luck et al. |
| 4,277,428 A | 7/1981 | Luck et al. |
| 4,343,127 A | 8/1982 | Greve et al. |
| D266,042 S | 9/1982 | Moore et al. |
| D266,720 S | 11/1982 | Moore et al. |
| 4,359,507 A | 11/1982 | Gaul et al. |
| 4,361,612 A | 11/1982 | Shaner et al. |
| 4,364,984 A | 12/1982 | Wentworth |
| 4,388,138 A | 6/1983 | Brown et al. |
| 4,396,673 A | 8/1983 | Ball et al. |
| 4,441,296 A | 4/1984 | Grabendike et al. |
| D274,107 S | 6/1984 | Gordon |
| D274,944 S | 7/1984 | Coppa |
| 4,486,264 A * | 12/1984 | McKernan .................. 156/538 |
| 4,503,115 A | 3/1985 | Hemels et al. |
| 4,544,440 A | 10/1985 | Wheeler |
| 4,550,540 A | 11/1985 | Thorn |
| 4,552,797 A | 11/1985 | Munk et al. |
| D282,426 S | 2/1986 | Heimberger et al. |
| 4,579,613 A | 4/1986 | Belanger |
| 4,602,466 A | 7/1986 | Larson |
| 4,610,900 A | 9/1986 | Nishibori |
| 4,610,913 A | 9/1986 | Barnes |
| D286,177 S | 10/1986 | Case et al. |
| 4,622,190 A | 11/1986 | Schultz |
| 4,643,787 A | 2/1987 | Goodman |
| D292,766 S | 11/1987 | Palka |
| 4,706,431 A | 11/1987 | Corvese |
| 4,720,363 A | 1/1988 | Mayumi et al. |
| 4,811,538 A | 3/1989 | Lehnert |
| 4,830,929 A | 5/1989 | Ikeda et al. |
| 4,853,062 A | 8/1989 | Gartland |
| 4,876,838 A | 10/1989 | Hagemeyer |
| D304,983 S | 12/1989 | Palka |
| 4,896,471 A | 1/1990 | Turner |
| 4,901,493 A | 2/1990 | Thorn |
| 4,908,990 A | 3/1990 | Yoon et al. |
| 4,942,084 A | 7/1990 | Prince |
| 4,955,800 A * | 9/1990 | Rothwell et al. ............... 425/63 |
| D311,957 S | 11/1990 | Hall |
| D314,242 S | 1/1991 | Mikolaitis |
| D314,625 S | 2/1991 | Hall |
| 5,016,414 A | 5/1991 | Wang |
| D319,884 S | 9/1991 | Hall |
| 5,074,087 A | 12/1991 | Green |
| 5,074,092 A | 12/1991 | Norlander |
| 5,075,059 A | 12/1991 | Green |
| 5,142,835 A * | 9/1992 | Mrocca ................... 52/309.12 |
| 5,167,105 A | 12/1992 | Isban et al. |
| 5,184,423 A * | 2/1993 | McCarty ...................... 49/501 |
| D335,982 S | 6/1993 | Brandon |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| D349,352 S | 8/1994 | Csati |
| 5,344,484 A | 9/1994 | Walsh |
| 5,355,654 A | 10/1994 | Stanley |
| 5,369,869 A | 12/1994 | Bies et al. |
| 5,397,406 A | 3/1995 | Vaders et al. |
| 5,401,556 A | 3/1995 | Ishitoya et al. |
| 5,443,891 A | 8/1995 | Bach |
| 5,470,631 A | 11/1995 | Lindquist et al. |
| D366,939 S | 2/1996 | Schafernak |
| D367,121 S | 2/1996 | Schafernak |
| D370,269 S | 5/1996 | Schafernak |
| D371,852 S | 7/1996 | Schafernak |
| 5,537,789 A | 7/1996 | Minke et al. |
| 5,543,234 A | 8/1996 | Lynch et al. |
| D375,424 S | 11/1996 | Burwick |
| 5,634,508 A | 6/1997 | Herbst |
| D382,350 S | 8/1997 | Lynch |
| 5,660,021 A * | 8/1997 | Wolgamot et al. ........ 52/783.12 |
| D388,196 S | 12/1997 | Schafernak et al. |
| 5,766,774 A | 6/1998 | Lynch et al. |
| 5,782,055 A | 7/1998 | Crittenden |
| 5,887,402 A | 3/1999 | Ruggie et al. |
| RE36,240 E | 6/1999 | Minke et al. |
| D411,022 S | 6/1999 | Schafernak et al. |
| 5,950,382 A | 9/1999 | Martino |
| 6,024,908 A * | 2/2000 | Koncelik ................ 264/331.11 |
| 6,068,802 A * | 5/2000 | Berghorn et al. ............ 264/46.5 |
| D426,645 S | 6/2000 | Bonomo et al. |
| 6,073,419 A | 6/2000 | Moyes |
| 6,092,343 A | 7/2000 | West et al. |
| 6,132,540 A | 10/2000 | Barber et al. |
| 6,200,687 B1 | 3/2001 | Smith et al. |
| 6,309,503 B1 | 10/2001 | Martino |
| 6,312,540 B1 | 11/2001 | Moyes |
| 6,335,082 B1 | 1/2002 | Martino |
| 6,401,414 B1 | 6/2002 | Steel et al. |
| 6,485,800 B1 | 11/2002 | Liittschwager et al. |
| 6,487,824 B1 | 12/2002 | West et al. |
| 6,554,048 B1 | 4/2003 | Jella |
| 6,586,085 B1 * | 7/2003 | Jella ........................ 428/319.1 |
| 6,588,162 B2 | 7/2003 | Lynch et al. |
| 6,620,459 B2 | 9/2003 | Colvin et al. |
| 6,899,835 B2 | 5/2005 | Liittschwager et al. |
| 7,137,232 B2 | 11/2006 | Lynch et al. |
| 7,178,308 B2 | 2/2007 | Fagan et al. |
| 7,284,352 B2 | 10/2007 | Lynch et al. |
| 7,337,544 B2 | 3/2008 | Fagan et al. |
| 7,370,454 B2 | 5/2008 | Lynch et al. |
| 2001/0001356 A1 | 5/2001 | West et al. |

| | | | |
|---|---|---|---|
| 2001/0026862 | A1 | 10/2001 | Smith et al. |
| 2001/0052657 | A1 | 12/2001 | Jacobsen |
| 2002/0000683 | A1 | 1/2002 | Sears et al. |
| 2002/0005602 | A1 | 1/2002 | Jacobsen |
| 2002/0068161 | A1 | 6/2002 | Matuana et al. |
| 2002/0091218 | A1 | 7/2002 | Ford et al. |
| 2002/0106498 | A1 | 8/2002 | Deaner et al. |
| 2002/0121327 | A1 | 9/2002 | Mente et al. |
| 2002/0121340 | A1 | 9/2002 | Mente et al. |
| 2002/0155223 | A1 | 10/2002 | Colvin et al. |
| 2002/0186465 | A1* | 12/2002 | DeSanto et al. ............. 359/460 |
| 2003/0139199 | A1* | 7/2003 | Kinnula et al. ............. 455/550 |
| 2003/0171457 | A1 | 9/2003 | Matuana et al. |
| 2003/0200714 | A1 | 10/2003 | Minke et al. |
| 2003/0226329 | A1 | 12/2003 | Hubbard |
| 2004/0013508 | A1* | 1/2004 | Ziegler ....................... 414/732 |
| 2004/0034113 | A1 | 2/2004 | Shidaker et al. |
| 2004/0067353 | A1 | 4/2004 | Miller et al. |
| 2004/0219382 | A1 | 11/2004 | Davina et al. |
| 2007/0198117 | A1* | 8/2007 | Wajihuddin ................. 700/114 |

FOREIGN PATENT DOCUMENTS

| | | |
|---|---|---|
| CA | 2 437 826 | 8/2002 |
| DE | 525520 | 5/1931 |
| DE | 3801486 A1 | 8/1989 |
| EP | 0 049 299 B1 | 4/1982 |
| EP | 0 103 048 A2 | 3/1984 |
| EP | 0 225 629 B2 | 6/1987 |
| EP | 0 346 640 A1 | 12/1989 |
| EP | 0688639 A2 | 12/1995 |
| EP | 0 688 639 A3 | 3/1996 |
| GB | 460611 | 10/1936 |
| GB | 2 349 163 A | 10/2000 |
| GB | 2349163 A * | 10/2000 |
| WO | WO 01/04448 A1 | 1/2001 |
| WO | WO 02/064337 | 8/2002 |
| WO | WO 03/020615 | 3/2003 |
| WO | WO 2004/076141 A2 | 9/2004 |

OTHER PUBLICATIONS

AIMCAL "Henkel Adhesives Profile | AIMCAL-Sourcebook," web page at http://www.aimcal.org/sourcebook/resultsprofile.asp?RECORD_KEY=id&id=301&search..., as available via the Internet and printed Jun. 18, 2004.

A recorded voluntary standard of the trade published by the U.S. Dept. of Commerce, Commercial Standard CS73-61, Old Growth Douglas Fir, Sitka Spruce, and Western Hemlock Doors, 3 pgs., effective Mar. 20, 1961.

Architectural Woodwork Quality Standards, Guide Specifications and Quality Certification Program, Fifth Edition, The Architectural Woodwork Institute, p. 109.

Ashland, "Ashland Specialty Chemical Company," web page at http://www.chembuyersguide.com/partners/ashspec.html, as available via the Internet and printed Jun. 18, 2004.

Aurora Brochure, "Elements of Enduring Beauty", dated 2002.

BASF, "BASF Group: Polyurethane/polymer foams," web page at http://www.corporate.basf.com/en/innovationen/labors/polymerforschung/Arbeitsgebiete/P..., as available via the Internet and printed Jun. 29, 2004.

Douglas Fir Doors, E. A. Nord Company, Specifications of Pacific Northwest Fir Doors, 3 pages, 1953.

Elite Doors Brochure, "America's Finest Molded Wood Fiber Doors, from Start to Finish," 1993.

"Factory-Fitted Douglas Fir Entrance Doors," U.S. Department of Commerce, Commercial Standard CS91-41, Feb. 10, 1941.

Feirer, John L., "Cabinetmaking and Millwork," Chas. A. Bennett Co., Inc., Peoria, IL., pp. 4, 8-14, 145-146, 596-597,684-687, dated 1970.

GIPSA, "Electronic Monitoring and Control Systems," web page at http://www.usda.gov/gipsa/reference-library/vrml/limswit.htm, as available via the Internet and printed Jun. 29, 2004.

Hechinger Brochure, Mar. 16, 1986.

Jowat Corporation, "Jowat Manufactures Edge Banding and Profiline Hot Melt Adhesives for the Woodworking Industry." Web page at http://www.adhesiveplus.com/catalog/jowat.html, as available via the Internet and printed Jun. 18, 2004.

Jeld-Wen Brochure, "Knotty Alder Composite Exterior Doors," dated 2003.

Lloyd, William B., "Millwork Principles and Practices, Manufacture-Distribution-Use," Cahners Publishing Company, Inc., Chicago, IL., in assoc. with The National Woodwork Manufacturers Association, Inc., pp. VI-XV, 192, 241, 116-117, 167, 173, dated 1966.

Masonite Brand Door Facings—Brochure, published in 1987.

Mercer, Henry C., Sc. D., "Ancient Carpenter's Tools," The Bucks County Historical Society, Doylestown, PA, p. 131-133, 1960.

Quality Doors Brochure, "How to Price•Order•Install," #301, 1988.

Singh, Dr. S. N., "Blowing Agents for Polyurethane Foams," ChemTec Publishing, web page at http://www.chemtec.org/books/rap/rap_119.html, published 2002, 104 pages, as available via the Internet and printed Jun. 29, 2004.

Stepan, "Contact Us: US and Canada," web page at http://www.stepan.com/en/contact/na/contact.asp, as available via the Internet and printed Jun. 29, 2004.

Sweet's Catalouge, The Sun-Dor Line, Section 8.3/50, p. 7, 1981.

Sweet's Catalogue, Section 8.3/MO, p. 3, door in center of page, 1981.

"The New Mission Series," Product Brochure by Nord, Part of the Jeld-Wen family, 300 W. Marine View Drive, Everett, WA 98201-1030, dated 2001.

Thomas Register, "Industry Answers Results," web page at http://www.thomasregister.com/SidebarNavigation.aspx?search_type=product&search_stri..., as available via the Internet and printed Jun. 30, 2004.

Visador Brochure, p. 1, C4, date unknown.

Patent Cooperation Treaty, International Search Report, International Application No. PCT/US2004/021312, mailed on Nov. 29, 2004, 11 pages.

RAKOLL® Woodworking Adhesives Advertisement, published by H.B. Fuller Co., 2000.

H.B. Fuller, Rapidex® Reactive Hot Melts, Productivity Proposal, Nov. 20, 2001.

ITS Intertek Testing Services, Fire Test Report, p. 5 of 9, Report Date Jan. 27, 2003.

Assembly Product Training Technology Overview, presented by H.B. Fuller Co. to Chicago Glue Machine, May 28, 2003.

H.B. Fuller presentation to Black Brothers—HB, Jun. 24, 2003.

A Winning Combination . . . H.B. Fuller Reactive Hot Melts and Black Bros. Equipment, presented on Jul. 11, 2003 at IWF Trade Show.

Lean Door Manufacturing, presented in Sep. 2003 by H.B. Fuller Co. during a public symposium.

Pieper, Mary, Program Helps Businesses Be More Efficient, published online Sep. 30, 2003.

* cited by examiner

METHODS AND SYSTEMS FOR THE AUTOMATED MANUFACTURE OF COMPOSITE DOORS

CROSS REFERENCE TO RELATED APPLICATIONS

This application claims priority to U.S. Provisional Patent Application Ser. No. 60/483,980, filed Jul. 1, 2003. The disclosure of Provisional Patent Application Ser. No. 60/483,980 is hereby incorporated by reference in its entirety.

FIELD OF INVENTION

The present invention relates to methods and systems for the automated assembly of composite doors, and doors made by such automated assembly.

BACKGROUND

Wood-based doors may be either solid wood or may be made of a wood-based composite. Composite wood doors may comprise a supportive frame that is at least partially covered with a wood-containing water-resistant layer known as a molded skin or a door skin. In some cases, the composite door may have an inner core that is filled with a cellulosic or synthetic polymer material.

To assemble a composite door, a door frame, usually including at least two horizontal pieces called rails and at least two vertical pieces called stiles, may be assembled using either glue or fasteners to hold the frame together. The frame may then be placed on top of a door skin, such that the side of the door skin facing the frame will become the inside of the door, and the other side of the door skin will become one of the outside surfaces of the door. Next, a material to form the inner core of the door may be applied to the areas of the door bounded by the frame and door skin. Various core materials, such as wood block, particleboard, or medium density fiberboard may be used for the core. Also, combinations of these materials may be used to form the core. Subsequently, a second door skin may be placed on top of the frame and core to make the other outside surface of the door.

Manufacturers of composite doors strive to produce composite doors of high quality that closely resemble a solid wood door. There is also a need, however, to reduce the cost of manufacturing composite doors. Additionally, as manufacturing doors can be a physically demanding and labor-intensive endeavor, there is a need to strive to improve the utilization of the labor force. Yet another consideration is the need to reduce waste in the production process and to minimize the amount of raw materials used. Thus, there is a continuing need to provide processes and systems to optimize production of composite doors.

SUMMARY

Embodiments of the present invention comprise methods and systems for the automated assembly of composite doors. In one embodiment, the present invention may comprise an automated process for making composite doors comprising a substantially continuous series of steps such that the individual doors are made substantially in tandem rather than in batch. The assembly of an individual door may therefore be substantially independent of the assembly of any other door if desired.

The present invention also provides systems for the automated assembly of composite doors. In one embodiment, the system may comprise a plurality of stations comprising a continuous series of steps for the automated assembly of a door. Using the systems of the present invention, individual doors may be made substantially in tandem rather than in batch, such that the assembly of any one door may be substantially independent of the assembly of any other door.

There are a variety of other embodiments of the present invention. For example, in one embodiment, a door may be made such that its construction is substantially independent of any other door. As another example, other embodiments of the present invention may comprise composite doors made using methods and systems for automated assembly. In one such embodiment, the door comprises a composite door having an interior core of polyurethane foam.

Certain embodiments of the present invention may provide advantages over methods and systems for door assembly that do not employ a continuous series of steps such that the individual doors are made in tandem, rather than in batch. Additionally, the methods and systems of the present invention may provide for doors of increased quality due to the use of a continuous flow process that allows for parameters specific to an individual door to be varied. This may allow for custom manufacturing of doors of varying specifications and/or design without interruption of the production line. The resultant flexibility in the manufacturing process may result in doors of improved quality for less cost. By producing a better quality product, warranty costs to the manufacturer may be reduced. In addition, the streamlined process may result in a rapid turnaround that allows for doors to be made and shipped in the same day.

Also, by using a continuous flow process, there may be less build-up of starting components (e.g., frame parts, door skin substrates, and core materials) intermediate product (e.g., assembled frames, door skins, doors to be trimmed), and final goods to be shipped and sold. With less build-up of materials, clean-up may be reduced. The reduced build-up of materials may also result in a more environmentally friendly work place.

The automated processes and systems of the present invention may also improve the utilization of the labor force. For example, automation may substantially reduce the need for lifting and other physically demanding tasks by the labor force. Thus, there may be a reduction in worker injury and/or an increase in worker satisfaction.

In certain embodiments of the present invention, the automated procedures may allow for the use of a liquid or foam core. The use of a liquid or foam core may comprise streamlining of the assembly process, in that one type of core material may be adapted for use with doors of almost any size and/or design, since the liquid or foam can conform to most door skin patterns and door sizes. Also, there may be an increased tolerance for door skins that vary in thickness due to the ability to vary the amount of liquid or foam used for each door. The use of a foam core may therefore provide for superior performance as well as a cost savings over conventional door filling.

From the foregoing summary, it is apparent that one object of the present invention is to provide methods and systems for the automated assembly of composite doors that may result in a lower cost door with better performance properties. It is to be understood that the invention is not limited in its application to the specific details as set forth in the following description and figures. The invention is capable of other embodiments and of being practiced or carried out in various ways.

DETAILED DESCRIPTION

Figure 1:
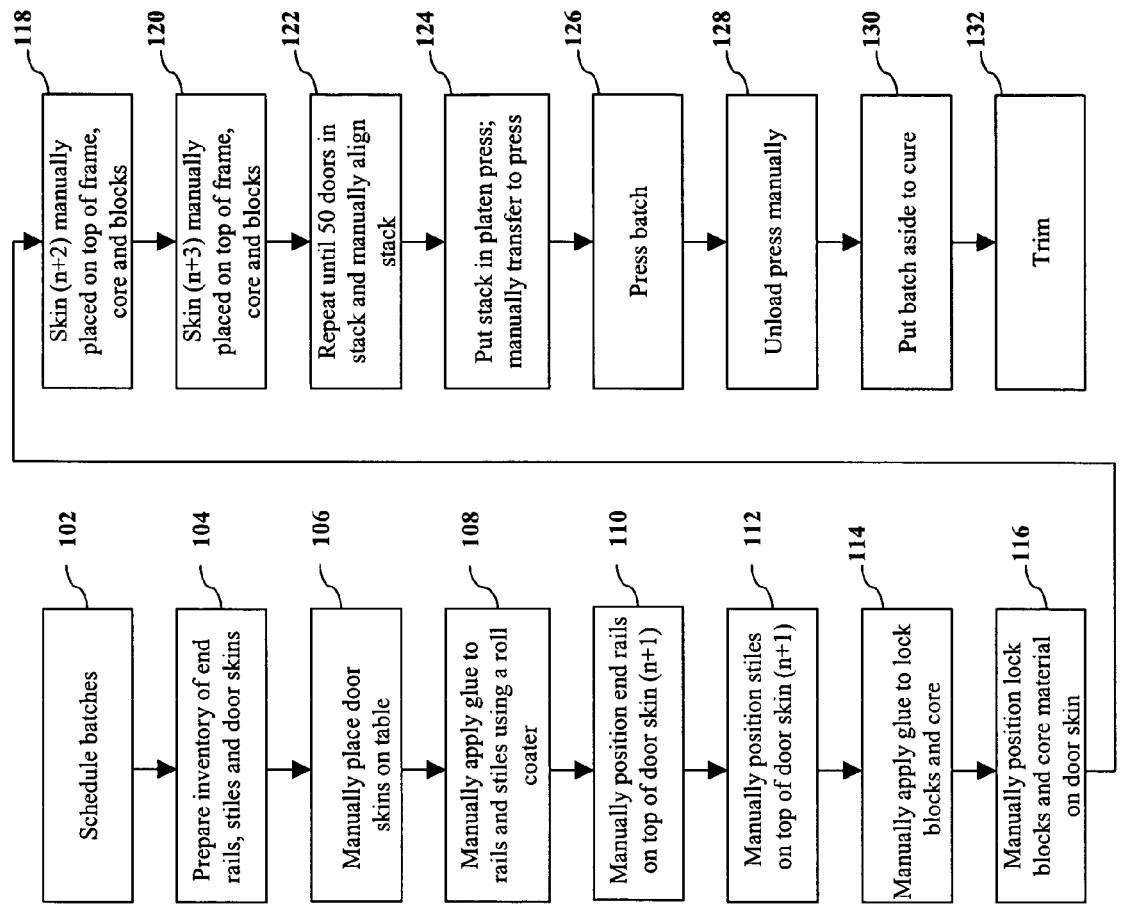
FIG. 1 shows an overview of steps that may be used for batch assembly of composite doors as is known in the prior art.

Embodiments of the present invention provide methods and systems for the automated manufacture of composite doors, and doors made using such methods and systems. The methods of the present invention may be embodied in a variety of ways. In one embodiment, the present invention comprises an automated process for making composite doors comprising a substantially continuous process, wherein individual doors are made substantially in tandem rather than in batch, such that the assembly of an individual door is substantially independent of the assembly of any other door.

A substantial number of the steps in the assembly process may be automated. For example, the assembly process may comprise the automated step of assembling a frame for the door. Once the frame has been assembled, the assembly process may comprise the automated step of applying adhesive to the assembled frame, and in some embodiments, using an automated system to position the assembled frame with adhesive on top of a first door skin.

At this point, the assembled door may comprise a frame and one door skin. In some cases, the composite door may comprise a hollow core. Or, the composite door may comprise a core that is at least partially filled. As used herein, the core comprises the internal part of the door. In one embodiment, the core may comprise the portion of the door bounded by the frame and the two door skins. In alternate embodiments of the present invention, the assembly process may therefore comprise applying an interior core material to the frame or the frame-door skin assembly.

Once the frame, first door skin, and optionally, the core, are assembled, an automated placement system may be used to place the second door skin on top of the frame. After the composite door comprising two door skins, a frame, and optionally the core material, is assembled, the assembled composite may be pressed to facilitate adhesion of the substrates to form a door.

Alternate embodiments of the present invention comprise systems for the automated assembly of a composite door. The system may comprise a series of stations to provide for a substantially continuous series of assembly steps. In one example embodiment, the system may comprise an assembly line designed such that the individual doors may be made substantially in tandem rather than in batch. The assembly of an individual door may therefore be substantially independent of the assembly of any other door.

The system may comprise a number of stations and/or devices to facilitate the automated assembly of composite doors. For example, the system may comprise a station (or stations) for automated assembly of the door frame. In one example embodiment, the automated frame assembly station may comprise the use of an adhesive as a means to hold the frame together. For administration of the adhesive, the system may include a device for automated application of an adhesive to the frame.

The system may also include a station for automated positioning of a frame that has been coated with adhesive on top of a first door skin. At this point, the assembled door may comprise a frame and one door skin. In some cases, the composite door may comprise a hollow core. Alternatively, the core may be at least partially filled. In one embodiment, the system may therefore comprise a device for applying an interior core material to the frame either before or after it is positioned on the first door skin.

Once the frame, the first door skin, and optionally, the core, are assembled, an automated placement system may be used to place a second door skin on top of the frame. After the door comprising two door skins, a frame, and optionally the core material is assembled, the assembled composite may be pressed to facilitate adhesion of the substrates to form a door.

Thus, the present invention comprises methods and systems for making composite doors comprising automated assembly of the frame, door interior, and door skins, as well as doors made by the automated assembly process. Previous attempts to automate the process of manufacturing composite doors have addressed individual steps used in the manufacturing process, or have employed pre-manufactured components that can be processed in batches. In the batch assembly process, production may be increased by making multiple doors at one time. For example, batches of 50 doors may be assembled at one time using parts which are pre-made and cut to size. Although assembling doors in batches may increase productivity, the process is still labor intensive. Thus, batch assembly of 50 doors may require an average of about 5-10 individuals to produce about 125-250 doors per hour.

As a way to understand the automated assembly processes and associated systems of the present invention, referral may be made to a typical batch assembly process (FIG. 1). The first step of batch assembly (102) may, for example, involve scheduling of the batches to be produced. To schedule a production batch, a set quantity of starting materials or pre-manufactured components must be readily on hand. For example, in the situation where only five doors are needed, a decision must be made whether to manufacture a standard batch (i.e., 50 doors).

Next, a number of frame parts (at least two end rails and two stiles per door) need to be prepared and set aside (104). Also, for a batch of 50 doors, at least 100 door skins of the correct style and size may be pre-made and set aside (104).

To begin the batch assembly process, a door skin may be laid on the assembly table (106). Generally, this step is performed manually. Next, PVA glue, casein, or other conventional glue may be manually applied to the stiles and rails using a roll coater (108). The end rails (to form the top and bottom of the door frame) may then be manually placed on the door skin along the top and bottom edge (110). At this point, the stiles (to form the sides of the frame) may be manually positioned on top of the door skin, and perpendicular to the end rails (112). Next, adhesive may be applied to the lock block(s) and other core materials (114), and then the selected core materials may be manually positioned on the door skin (116). A second skin may then be manually applied to the frame to provide the upper surface of the first door (118).

At this point, the entire process described above may be repeated for the next door in the batch. For example, a third skin may be manually positioned upside down on top of the second skin such that the assembly process for the second door is initiated (120). Once the second door is made, a fifth skin may be positioned upside down on top of the second door for preparation of the third door. The process may continue until a complete batch of doors has been made (122).

Once a complete batch of doors (i.e., 50 doors) has been assembled in this manner, the stack may be moved as a single unit to a platen press (124), where the entire stack may be compressed to facilitate curing and adhesion of the substrates (126). The stack may then be unloaded from the press (128) and set aside (e.g., for several hours) to allow the resins and adhesives used in the door to cure (130). Finally, the doors may be trimmed to length and width (132).

Although modifications may be made from the generalized method shown in FIG. 1, the batch assembly process generally requires manual intervention at numerous steps. For example, and as shown in FIG. 1, the batch process may require manual intervention at the steps of laying the door skin on the assembly table (106); positioning and gluing the frame to the door skin (108, 110, 112); applying glue to the lock blocks and core material (114); positioning the lock blocks and core material in the partially formed door (116); applying the top skin and the next bottom skin (118, 120); transferring the stack to the press (124); unloading the press (128); and trimming the doors (132).

Previous attempts have been made to automate the process of manufacturing composite doors. For example, computerized hoppers have been developed for processing of the stiles and end rails to the assembly area. Also, the manufacturing facility may utilize pre-assembled door frames, although, when pre-assembled, the door frames may be awkward to handle and difficult to ship. In addition, it may be difficult to stack assembled doors prior to curing due to movement of parts.

In contrast to batch processing, the present invention comprises an automated assembly process that allows for assembly of individual doors as a continuous flow process. The methods and systems of the present invention may employ unique materials selected to optimize the automated assembly process. As a result of the flexibility inherent to the methods and systems of the present invention, assembly of each door may be individualized as required. The doors produced may therefore comprise a higher quality product. In one embodiment, the methods and systems of the present invention allow for increased variety of the final product and lower production costs as compared to doors made using the batch process.

Figure 2:
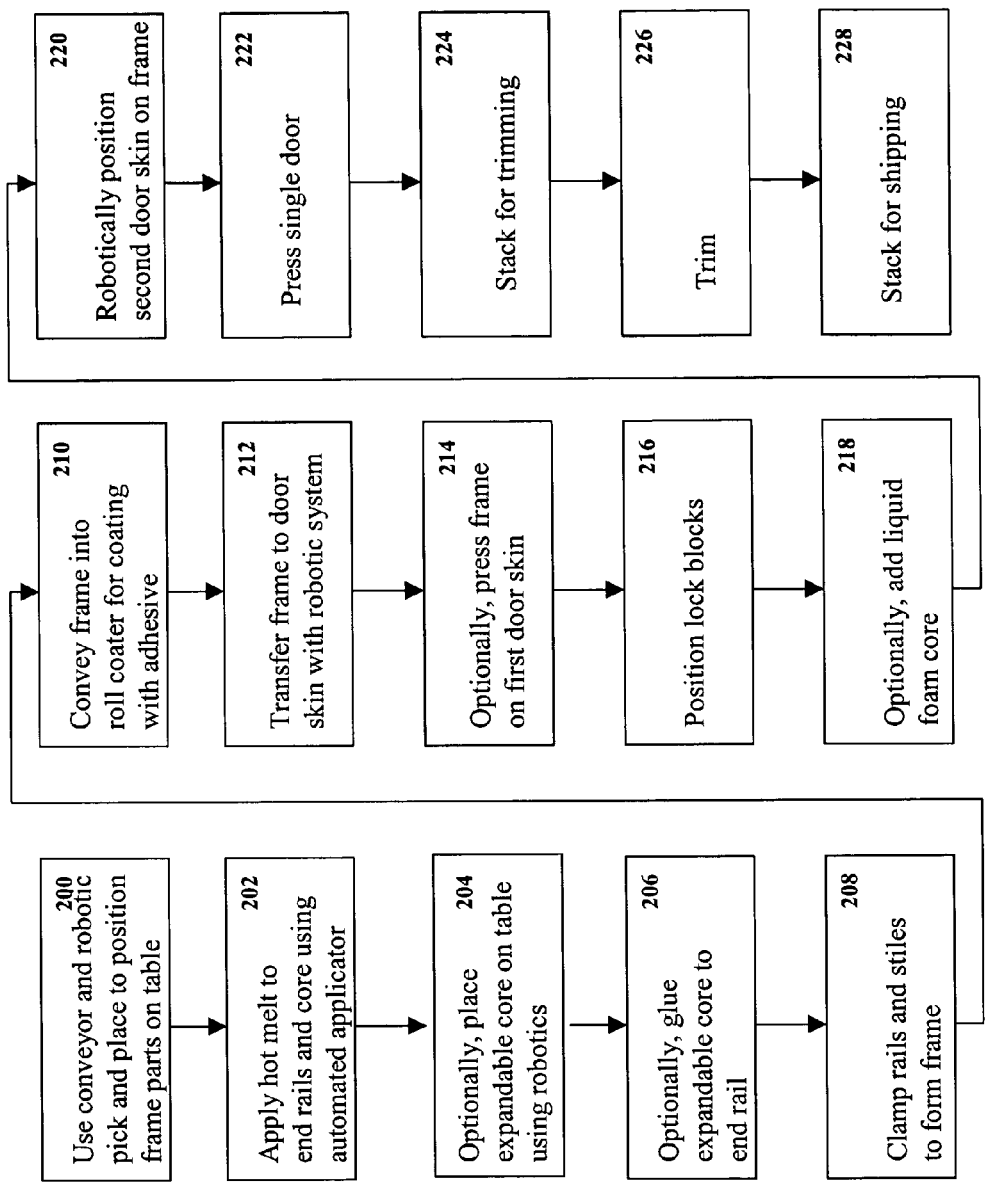
FIG. 2 shows an overview of a method for the automated assembly of composite doors according to an example embodiment of the present invention.

An example embodiment of a method of the present invention is shown in FIG. 2. It should be understood that the method is not limited to the specific steps, or the sequence of steps shown, but may be varied as would be apparent to those in the art. As shown in FIG. 2, a substantial number of the steps in the assembly process may be automated. Also, there may be many points at which the assembly process is initiated. In one example embodiment, the assembly process of the present invention may begin with the assembly of the frame. Generally, the frame may comprise at least two stiles as the sides of the door frame, and two end rails as the top and bottom of the door frame. The frame may also comprise additional parts to further secure the structure, such as additional stiles internal to the stiles comprising the outer edges of the door, or additional rails positioned internal to the end rails. Also, lock blocks, although not formally part of the frame, may function to support the frame, particularly if the lock blocks are positioned parallel to one or both stiles.

To assemble the frame, the stiles may be loaded into a feeder, which may deposit the stiles on a conveyor belt for delivery to the frame table (200). For example, in one embodiment, the stiles may be delivered to the table at a rate of about one set (i.e., two stiles) every 10 to 15 seconds. To assist in maintaining a high quality product, the quality of the stiles may be monitored visually by an employee as the stiles are loaded into a feeder.

The automated assembly process may comprise the use of computerized robotic systems at individual work stations in the assembly line. Robotic pick and place systems tailored to specific assembly steps may be adapted from commercially available systems, or may be custom-made by manufacturers in the art. A robotic pick and place system may be used for assembly of the frame. In one example embodiment of the present invention, a conveyor may be used to deliver the stiles to the frame assembly station, and then the end rails may be positioned on the frame table using a robotic pick and place system (200). To position the end rails, at least two end rails may be removed from a hopper by the pick and place system and held in position over the frame table as the stiles are positioned. The robotic arm may then position the end rails perpendicular to the stiles such that the two end rails and two stiles are aligned approximately corner-to-corner to form the frame.

At this point, the parts of the frame may be fastened together using hot-melt welding at each corner or mechanical fastening (202). Application of the hot melt may be automated such that human supervision is not required. The hot melt welding may comprise conventional ethylene vinyl acetate (EVA) or crosslinking reactive hot melts, such as those available from the H.B. Fuller Company, The Reynolds Company (Greenville, S.C.), National Starch and Chemical, Ashland Specialty Chemical Company (Dublin, Ohio), Henkel, 3M, Forbo Adhesives LLC (Research Triangle Park, N.C.), or Jowat Corporation (Plano, Tex.). In one example embodiment, hot melt glue comprising an amount less than one gram may be applied to the corners of the frame. The hot melt may be applied to the end rails as they are held in position over the stiles, such that when the end rails are placed next to the stiles, the glue is in place.

A variety of materials may be used for the core of the door. The material used for the core may determine, in part, the point at which the core is applied to the door. For example, the composite door may comprise an expandable mesh core. The mesh core may be fixed in shape or may comprise a structure that allows for expansion along the length and/or the width of the mesh as a means to adjust the final dimensions of the core. For example, the mesh may comprise a honeycomb type structure. The expandable mesh may be of a cellulosic material, such as cardboard. Alternatively, a mesh made of plastic or other materials compatible with the structure of the door may be used. In one example embodiment, an expandable corrugated cardboard core having a honeycomb type structure (American Containers Corporation, Plymouth, Ind.) may comprise the cellulosic core.

To assemble the frame and mesh core, the core may be placed on the assembly table (204) and attached to the frame or to part of the frame (206). A variety of methods may be used to attach the mesh to the frame. In one embodiment, an adhesive may be used to attach the mesh core to one or both of the end rails. Alternatively, a fastener, such as staples may be used to attach the mesh core to the end rails, or to another part of the frame. In one example embodiment, an EVA hot melt may be used to attach a honeycomb corrugated cardboard core to the end rails. If an EVA hot melt is used, about a gram of hot melt may be applied to a plurality of locations on either the flat ends of the unexpanded corrugated core or on the inside surface of the rails. After adhesive application, the core and rails may be pressed together to allow the adhesive to harden. A clamp may be used to press the core and rails together. The core may then be expanded by drawing the rails apart to the distance defined by the stiles.

The frame (with or without a core) may then be clamped to allow the hot-melt adhesive applied to the frame corners (202) to adhere the frame sections (i.e., rails and stiles) together (208). As with other steps in the assembly process, the step of clamping the frame together may be automated. In one embodiment, an adjustable pneumatic clamping system may be used to clamp the frame together. The pneumatic clamping system may be computer-controlled, allowing the welding to occur without manual supervision. Also, the pneumatic clamping system may comprise a table that adjusts in length and/or width to accommodate clamping of frames of various sizes. In one example embodiment, the clamps may be fixed on one side of the table and adjustable on the other side of the table.

Once the door frame is assembled, it may be attached to the first door skin. In one embodiment of the present invention, an adhesive may be used to adhere the frame to the door skin. The adhesive may comprise a fast setting glue, such as a hot-melt moisture cure or reactive hot-melt PUR adhesive. Hot-melt moisture cure or reactive hot-melt PUR adhesive is a reactive hot-melt which is part polyurethane and part ethylene vinyl acetate. Such hot-melt moisture cure or reactive hot-melt moisture cure or reactive hot-melt PUR adhesive may be obtained from a variety of commercial sources such as National Starch and Chemical Company (e.g., National Starch 20-145B), H.B. Fuller Company, Forbo Adhesives, LLC (Research Triangle Park, N.C.), The Reynolds Company (Greenville, S.C.), and Henkel Adhesives (Elgin, Ill.). Hot-melt moisture cure or reactive hot-melt PUR adhesive may be particularly suited to the automatic assembly process of the present invention because it is relatively fast setting. In one example embodiment, the adhesive applied to the surface of the frame comprises a setting time of less than 5 minutes. In alternate embodiments, the adhesive may comprise a setting time of about 10 to 90 seconds, or from about 10 to 30 seconds, or from about 10 to 15 seconds. Also, the PUR adhesive may act as a gap filler, thereby allowing for thickness variation in the various parts used to assemble the door, such as the door skins. Additionally, hot-melt moisture cure or reactive hot-melt PUR adhesive may comprise increased holding power due to the crosslinking functionality of the polyurethane component. Thus, in one embodiment of the present invention, the final door may be more stable as a result of the superior adhesive qualities of the PUR adhesive used for automated assembly.

The adhesive used to attach the frame to the door skin may be applied to one side of the frame (i.e., the side that will be adjacent to the first door skin) or to both sides of the frame to facilitate the eventual attachment of both door skins to the frame. In one embodiment, the adhesive may be applied to the frame surfaces using a roll coater (210). To apply the adhesive to only one side of the frame a one-sided roll coater may be used. Alternatively, a two-sided (double-sided) roll coater may be used to apply the adhesive to both sides of the frame. The frame may be transferred to a roll coater as part of the assembly line process. Using a bulk melter, a large volume of glue may be melted at a predetermined rate as required. In one example embodiment, quantities of PUR glue ranging from 5 to 55 gallons may be melted as required using a bulk melter, such as the Nordson BM20 Bulk Melter, and kept on hand for use.

Once adhesive is applied to either the bottom surface or both surfaces of the frame, the frame may be lowered onto a door skin positioned on an assembly table, such that the surface of the frame having applied adhesive is adjacent to the door skin (212). This step in the assembly process may also be automated. In one embodiment, the frame, and optionally the expandable mesh core, may be picked up and placed on a door skin that is positioned on an assembly table (212). For example, a robotic pick and place system may be used to transfer the frame (and attached core) to the door skin. Alternatively, the door skin may be transferred to the frame.

A zero reference point may be used with the robotic pick and place system as a means to position the frame properly on the door skin. In one example embodiment, the door skin and frame may be aligned using at least one 90 degree corner (i.e., fence) that lines up the frame with one side or corner of the door skin. Alternatively, a sensor guide may be used. When the sensor guide is used, the guide may index the door skin outwardly from the center, to thereby facilitate centering the frame on the door skin, and potentially leaving any extra door skin at the edges. Or the sensor may align the door skin and frame using a corner reference. The sensor guide may comprise a non-contact sensor providing input to a programmable logic controller (PLC). Sensors may be photoelectric or proximity type. In one embodiment, a limit switch may be used to prevent misalignment.

Once the frame is properly positioned on the door skin, the adhesive may adhere the frame to the door skin. Adhesion of the frame and underlying door skin may create a substantially water-tight bond. Additionally, pressure may be used to promote adherence of the frame to the door skin (214). For example, a single door piston press, or a nip roll or a series of nip rolls, or a continuous rolling press, may be used to apply bond pressure to the frame and door skin to facilitate adhesion of the frame to the underlying door skin. For example, door skins may be adhered to the frame by pressing the frame and underlying door skin with a panel express press system or single door piston press for about 10 to 15 seconds at about 75 to 100 pounds per square inch (psi) (about 5.27 to 7.03 kg/cm$^2$). The step of pressing the frame to the first door skin may not be required in certain embodiments of the present invention. For example, where both sides of the frame are coated with adhesive, pressing the frame to the first door skin may not be performed. Conversely, where a liquid foam core is used, pressing the frame to the first door skin may help create a water-tight seal, thereby facilitating application of the foam.

The assembly process may next provide for integration of those components that will comprise the door's interior. For example, lock blocks are structural units that may be included in composite doors to provide a bearing area for a lockset. The lock blocks provide a supportive structure that may allow the door to withstand the stress from installation of a lockset, and the stress of a lockset being repetitively operated. Lock blocks may be made from particleboard or other solid wood pieces. Alternatively, when used with a liquid or foam core, the lock blocks may also be made from a liquid or foam polymer, thus eliminating the need for a separate step for lock block placement. For example, if foam lock blocks are incorporated, they may be injected, poured, or extruded with an automated dispensing system onto the bottom door skin along the stiles or rails prior to placement of the top door skin.

The lock blocks may be positioned on the inner surface of the door skin and within the perimeter of the frame, such that the lock block is positioned in the appropriate place in the door (216) (FIG. 2). In one embodiment, a robotic pick and place system may be used to position the lock block. When solid lock blocks are used, the lock blocks may be stored in a hopper prior to use. In one embodiment, the lock blocks may be assembled in groups that may comprise lock blocks of a specific size and/or design. A variety of methods may be used to attach the lock block(s) to the door. In one example embodiment, the lock block(s) may be adhered to the door skin using a hot melt glue.

For example, in one embodiment of the present invention, a hopper containing the lock blocks may loaded by a monitor. The monitor may inspect the quality of the lock blocks, discarding those of inferior quality. A programmable glue gun may then be used to apply a bead of hot melt glue to one or multiple sides of the lock block. Subsequently, a robotic pick and place system may be used to place the lock block(s) onto the skin such that the lock blocks are placed at the correct position with respect to the door frame. Alternatively, the lock blocks may be positioned on the door frame using a robotic pick and place system prior to passing the frame through a roll coater.

Once the lock blocks are in position, and any required core material has been added, the door may be ready to have the second door skin applied. In one embodiment, the frame already has glue on the top surface. Alternatively, glue may be applied previously to the upper frame surface using a one-sided roller. If a one-sided roller is used, the one sided roller may be positioned on the assembly line to allow continuous flow of doors through the coater system. Generally, the same type of glue that was used to glue the first door skin to the frame may be used to glue the second door skin to the door frame.

In some cases, a liquid or foam may be used for the door core, rather than, or in addition to, a cellulosic mesh. Alternatively, other types of core materials, such as expanded polystyrene (EPS) foam, wood, fiber board, or plastic may be used as the core. In an embodiment, and as described above, the core material may be added prior to placing the frame on the door skin. Alternatively, the core may be added after the frame has been positioned on top of the first door skin. Or, the core may be added once the lock blocks are in position.

Still referring to FIG. 2, in one embodiment of the present invention, a liquid or foam polymer core may be applied after positioning the frame on the first door skin (218). For example, a liquid or foam core may be used as an alternative to, or in addition to, an expandable mesh core. In one example embodiment, a polyurethane foam may be used as a core. Alternatively, EPS foam or other types of plastic polymer may be used as the core. The foam may be sprayed or otherwise extruded onto the door skin in a manner such that the foam is held within the boundaries of the door frame. For example, a set of pour or spray nozzles containing multiple independent moveable heads may be used to apply a liquid or foam polymer to the framed door skin. Application of the liquid or foam polymer may be computer controlled, as for example, by employing a pre-programmable robotic arm to apply the foam. The use of a computer-controlled application of the liquid or foam may allow for various patterns of application to be employed for different types of doors. For example, a door may comprise a partially hollow core, such that foam is placed in strategic locations to make the final product stable. Alternatively, a door may be made to have a core that is completely filled with foam.

The use of a liquid or foam core may provide further flexibility to the process. As is known in the art, polymer foams may expand due to gas such as carbon dioxide or a blowing agent being trapped within the polymer during the polymerization step. The foam may comprise a substantially predictable rate of expansion such that, once the foam expands, the frame and underlying door skin may be filled substantially to capacity with the foam and optionally, any other core filling materials, such as lock blocks and the like.

The use of a foam polymer core may be highly suited to the automated process of the present invention because a foam polymer may be easy to apply automatically, adaptable to variations in the process and materials, and act as an adhesive and bond to the door skins. The adaptability of foam as a filler for the core may allow for use of one or a few types of foam for a variety of doors. Additionally, it may be faster to inject foam into the core than to individually position solid core elements. Also, the assembly of the door may be modified to accommodate any expansion of the foam core. For example, in one embodiment, the second door skin may applied before the foam has completely expanded, thereby allowing the foam to expand as far as the door skin will allow. In one embodiment, the foam may bond to the skin.

Where a foam core is used, the foam may comprise a predetermined density upon expansion. For example, in one embodiment, the density of the expanded foam may range from about 0.5 to about 5 pounds per cubic foot (pcf) (about 8.01 kg/m$^3$ to about 80.1 kg/m$^3$). Alternatively, the density of the expanded foam may range from to about 1 to about 2.5 pcf (16.02 to 40.05 kg/m$^3$), or from 1.25 to 2 pcf (20.03 to 34.02 kg/m$^3$). Also, the amount of foam used may depend on the type of door being made. In alternate embodiments of the present invention, the foam core may comprise about 10 to 50% of the core. Alternatively, some door cores may comprise greater than 80% foam, and even up to 100% foam.

Other fillers may be used as the core, either as an alternative to foam, or in addition to the foam. These additional fillers may be added to the door as part of the frame, or while the frame is being positioned on top of the first door skin, or after the frame has been positioned on top of the first door skin. As described above, in one embodiment, an expandable web such as a corrugated cardboard may be used as a core. Alternatively, the core may include solid support structures such as wood, wood block, particleboard, medium density fiberboard, and the like.

After application of the material used as the interior of the door is completed, a robotic pick and place system may be used to carry the top skin onto the frame (220). The robotic pick and place system may employ a vacuum to hold the skin for transfer, such that the release of the vacuum results in the upper skin being deposited onto the frame. Where a robotic pick and place system is used, a zero line reference point may be used to place the top skin in the proper location.

Once the second skin is in place, the assembled door comprising two door skins and a frame, and optionally, lock blocks and core material, may be adhered together. Application of pressure may used to facilitate adhering the door parts together. For example, a single door piston press, or a continuous rolling press, may used to press the bottom skin, frame, core material and upper skin substrates together (222). The use of a press may allow various pressures to be applied. Pressure may be applied over the entire surface of the door or may be restricted to the glueline surface (e.g., along the frame). In alternate embodiments of the present invention, the pressure on the glueline surface applied during pressing may range from about 25 to 250 pounds per square inch (psi) (1.76 to 17.6 kg/cm$^2$), or from about 50 to 200 psi (3.53 to 14.06 kg/cm$^2$), or from about 100 to 200 psi (7.03 to 14.06 kg/cm$^2$).

Once the substrates comprising the door have been adhered to each other, the door skin may be trimmed to the desired length and width. The nature of the adhesive used for attaching the frame to the door skin and the type of core material used may dictate the time required for the door to set prior to trimming. In one example embodiment of the present invention, the door may be ready for trimming in less than 20 minutes from exiting the press. In alternate embodiments, the door may be ready for trimming in 12 minutes or less after exiting the press. Because each door is made in tandem, rather than in batch, the doors may be individually trimmed as they exit the press. Alternatively, the doors may be stacked (224) and then trimmed (226). In one embodiment of the method of the present invention, a stack of about 50 to 60 doors may be formed prior to trimming. Once trimmed, the doors may be stacked for shipping (228).

The automated process of the present invention may allow for an increased rate for the assembly of composite doors as compared to batch methods of assembly. For example, the process time to complete the manufacture of one door up to the point of trimming may be 200 seconds or less, or in alternate embodiments, the process time for the assembly of an individual door may be 100 seconds or less, or even 12 seconds or less.

In addition to providing a highly automated methods and systems for door manufacture, the present invention may provide doors having a unique composition. Thus, in another embodiment, the present invention comprises a composite door made using a substantially continuous process wherein the individual doors are made substantially in tandem rather than in batch.

The method of assembly may allow for the use of unique materials for the door. For example, in one embodiment, the present invention may comprise a composite door comprising an interior core of a polymer foam. In one embodiment, the foam may comprise polyurethane. Alternatively, other types of foam or polymer may be used. In one embodiment, Expanded Polystryrene (EPS), melamine foam, or polypropylene foam may be used. In another embodiment, a solid plastic, such a polystyrene, polyvinyl chloride (PVC), and the like, may be used as a portion of the core. Alternatively, the door may comprise solid materials as filler for the core, such as wood block, particleboard, corrugated cardboard, medium density fiberboard, and the like. Where solid materials are used, they may be positioned using a robotic pick and place system. Alternatively, manual positioning may be used.

The use of a foam core may avoid some problems that can be associated with using solid support structures as the core material for the door. For example, with a foam core, there is generally no need for manual positioning of the core. Also, the use of a foam core may result in a door that displays increased consistency throughout. For example, a foam core may provide more consistent surface support. Also, due to the ability to fine-tune the amount of core material applied, and/or the extent that the foam is allowed to expand, the foam core may be more adaptable to substrate variations, such as variations in the thickness of the door skins being applied to the frame, or slight inconsistencies in the frame itself.

The amount of foam used may depend on the type of door being made. In alternate embodiments of the present invention, the foam core may comprise from 1 to 100% of the core volume, or from 20 to 100% of the core volume, or from 75 to 100% of the core volume.

Also, in certain embodiments, the present invention may comprise a door that uses a fast-setting adhesive to hold the frame together. Often, the period required for the composite door to set (i.e., such that any adhesives and/or resins are substantially cured) may comprise a substantial down-time in the manufacturing process. Still, it may be difficult to use a fast-setting adhesive for batch manufacture of doors because the adhesive may cure prior to application of all of the substrates for the door. Use of a fast-setting adhesive may allow for rapid assembly of an individual door as down-time for the adhesive to set is reduced. Also, use of a fast-setting adhesive may substantially avoid splitting and cracking of the wood frame, which may occur as a result of the insertion of fasteners such nails or screws that are usually used to make the frame.

In one example embodiment, the adhesive may comprise a hot-melt moisture cure or reactive hot-melt PUR adhesive. Alternatively, other fast-setting adhesives, such as hot-melt glue or contact cement may be used. Hot-melt moisture cure or reactive hot-melt PUR adhesives may be particularly suited to an automatic assembly process because they are relatively fast setting. In addition, the adhesive may act as a gap filler, and thereby allow for thickness variation in the various door parts, such as the frame or door skins. Also, a hot-melt moisture cure or reactive hot-melt PUR adhesive may display increased setting power as compared to other adhesives due to the crosslinking provided by the polyurethane. Thus, the door may be more stable as a result of the superior adhesive qualities of the adhesive used for the automated assembly.

The doors of the present invention may further comprise foam lock blocks. The use of foam lock blocks may provide increased homogeneity to the interior core. Also, foam lock blocks may be particularly well-suited to the automated assembly process, as addition of the lock block to the core may be incorporated into the step of application of a foam core.

Figure 3:
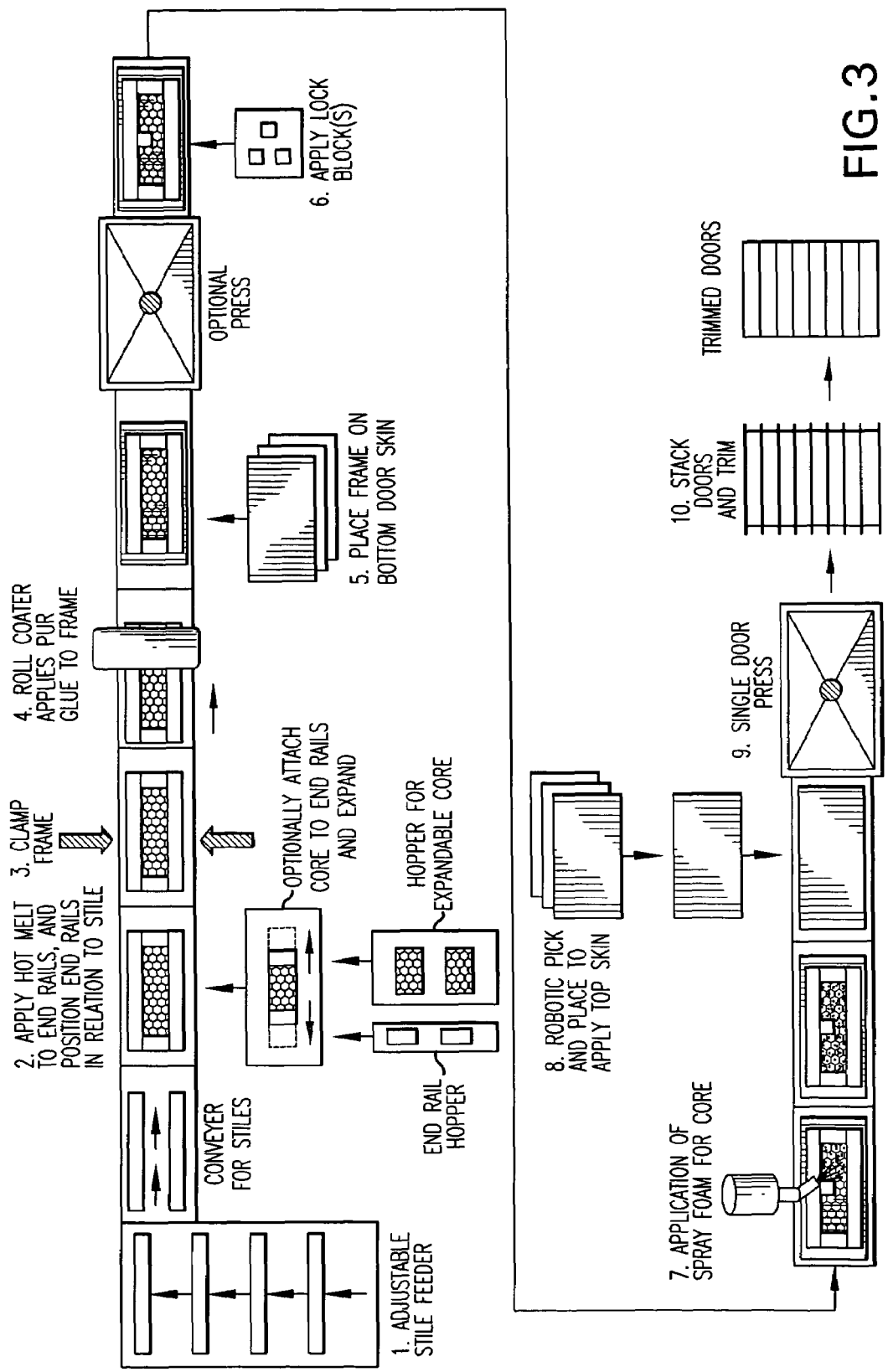
FIG. 3 shows an overview of a system for the automated assembly of composite doors according to an example embodiment of the present invention.

The present invention also comprises systems for the automated manufacture of composite doors. It should be understood that the system is not limited to the specific stations or stages or their sequence, but may be varied as would be apparent to those in the art. An example embodiment of a system of the present invention is shown in FIG. 3. The system of the present invention may be broken down into stations or stages. As shown in FIG. 3, at station 1, an adjustable stile feeder may be used to transfer stiles to the assembly line. In one embodiment, a worker may load stiles into the feeder, removing those stiles that are of unsatisfactory quality. A conveyor may be used to transfer stiles from the exit of the stile feeder to a frame assembly table.

The next station (e.g., station 2), may comprise a station for positioning the end rails on a frame assembly table. A worker loading the end rails into a hopper may monitor the input end rails, and remove those of inferior quality. In an example embodiment, a robotic pick and place system may be used to hold the end rail above the frame table until the selected end rail is in the correct position relative to the stiles. Next, a drop of hot melt glue may be applied to each end of both end rails. A minimal amount of glue (e.g., less than 1 gram) may be used for each end rail. At this point, the end rails may be lowered onto the table in correct position relative to the stiles.

Station 2 may further include a device for attachment of a core material to the frame. For example, as described above, in one embodiment, an expandable cellulosic mesh may be used as at least part of the core. Alternatively, as in the embodiment where a liquid or foam is used as the core, the cellulosic mesh core may not be required. In one embodiment, the expandable cellulosic mesh may comprise a honeycomb or corrugated cardboard mesh. Thus, in addition to hoppers for the end rails and stiles, there may be a hopper for the expandable mesh core. The mesh core may be fastened to either the end rails or the stiles at this stage. A robotic lift may then be used to position the expandable core adjacent to each end rail. The core may then be attached to the end rails, as for example, using an adhesive such as a reactive hot-melt PUR glue or another hot-melt glue. Alternatively, fasteners, such as staples, may be used to attach the core to the end rails. Once the core is attached to the end rails (or other part of the frame) the entire assembly may be expanded or shortened to the length required and positioned over an assembly table for application of hot-melt adhesive to the rails. At this point, the core/end rails may be positioned relative to the stiles on the assembly table to form a frame perimeter and internal core.

At the next station (e.g., station 3), the end rails (with or without any attached core material) and the stiles may be affixed to each other to form the door frame. To secure the frame, the frame with hot melt glue at each corner may be clamped. In an example embodiment, pneumatic clamps may be used. To facilitate the manufacture of doors of different sizes, the clamp may be fixed on one side and adjustable on the other side. For example, in one embodiment, the clamping table may expand and contract to various widths and lengths as required during the clamping process.

Unlike systems that manufacture doors in batch, the present invention may use a fast-setting adhesive to assemble the frame. Examples of adhesives that may be used include conventional hot-melt adhesives, polyurethane-based hot-melt adhesives (such as PUR hot-melt adhesives), contact cement, methacrylate adhesives, cyanoacrylate adhesives, epoxide adhesives, resorcinol-formaldehyde adhesives, or phenol-resorcinol-formaldehyde adhesives. The use of an adhesive to make the frame may facilitate rapid assembly for each individual door, and may substantially reduce splitting of the frame splitting due to insertion of fasteners that are usually used to make the frame.

At the next station (e.g., station 4), a roll coater may be used to apply an adhesive to the door frame. To apply adhesive to both sides of the frame, a double-sided roll coater may be used. In one embodiment of the system, a fast setting adhesive, such as a reactive hot-melt PUR adhesive, may be used to coat the frame. As described above, hot melt-moisture cure or reactive hot-melt PUR adhesive may be selected based upon the adhesive's rapid speed of setting speed, high durability of fastening, and gap filling capabilities. A bulk melter may be used to melt the adhesive that is used in the roll coaters. For example, a BM20 Bulk Melter (Nordson Corp., Duluth, Ga.) may be used to melt the required quantity of adhesive as supplied from a 5 gallon pail to a 55 gallon drum.

At the next station (e.g., station 5), the bottom door skin may be transferred to an assembly table. A robotic pick and place system may be used to lower the frame onto the bottom door skin. In one embodiment, the frame is picked up by the robotic carrier upon exiting the roll coater. The system may use a zero reference point to place the frame properly on the door skin.

Once the frame has been correctly positioned on the door skin, the assembly may be conveyed to the next station. In one embodiment, the next station may comprise a press to apply bond pressure to the frame and first door skin. Alternatively, in certain embodiments, pressing of the frame to the first door skin is not required. In the embodiment where a press is used at this point in the assembly process, the frame and door skin assembly may be pressed using a single piston press, a series of nip rolls, or a continuous press. The specific pressure used may vary depending on the type of door being made and the components being used. Also, in some cases, such as where a particleboard lock block is being used, pressing may occur after the lock block is placed in the door to facilitate wetting of the lock block with the adhesive and subsequent adhesion of the lock block to the door. The pressure used may range from 25 to 250 pounds per square inch (psi) (1.76 to 17.6 kg/m$^2$), but generally is in the range of about 75 to 100 psi (5.27 to 7.03 kg/m$^2$) at the glue line surface.

Next, and still referring to FIG. 3, lock blocks may be integrated into the door at the next station (e.g., station 6). The step of positioning the lock blocks may vary depending on the type of door being made and the type of lock blocks being used. For example, if a foam core is used, and foam is used for the lock blocks, addition of the lock blocks to the door may occur as part of the addition of the foam core (i.e., the next station). Or, if a particle board lock block is being used, the lock block may be placed on top of the underlying skin prior to pressing of the frame to the underlying skin. The hopper for the lock blocks may be loaded by the end rail monitor. Thus, in one embodiment of the system of the present invention, a single monitor may oversee stile selection and placement, end rail selection and placement, core selection and placement, and lock block selection and placement. Upon exit of a lock block from the hopper, programmable logic controlled (PLC) glue guns may be used to apply a bead of hot melt glue to one or multiple sides of the lock block. Although reactive hot-melt PUR glue may be used, conventional hot-melt glue may also be used for this step. As with other stages in the system, a robotic pick and place system may be used to place the lock block(s) onto the skin in the correct location.

In one embodiment of the system of the present invention, a foam or liquid polymer may be used as the door core. As shown in FIG. 3, application of a foam or liquid core may be performed after positioning of the lock blocks (e.g., station 7). In one embodiment, liquid polyurethane foam, such as that available from Sealed Air Corporation, DOW, or Stepan Company (Northfield, Ill.), may be used. For example, liquid foam with an expanded density ranging from about 0.7 to 5 lbs per cubic foot (11.21 to 80.1 kg/m$^3$) may be used for the core inside the door. The foam may be applied to the door using a set of pour or spray nozzles containing multiple independent moveable heads. Various spray patterns can be achieved through programming and/or robotics.

At the next station (e.g., station 8), a robotic pick and place system using vacuum technology may be used to place the top skin on the partially assembled door. Once the skin is properly positioned over the door frame, the vacuum may be released to deposit the door skin on the filled frame. As with positioning the frame on the first door skin, a zero line or corner reference point may be used to place the top skin in the proper location.

Once the second door skin is in place, the assembled composite may be transferred to a press (e.g., station 9) to press the two skins and frame, and optionally, lock blocks and a core, together. The press may be custom made or may comprise a commercially available single door press. If a liquid or polymer foam is used as the core, it may expand to help bond the two door skins to the core.

The door may then exit the press and be stacked for trimming (e.g., station 10). In one example embodiment, doors may be stacked for trimming in batches of about 50 to 60 doors. The use of a fast setting PUR adhesive to bond the door parts together may allow for trimming to occur shortly after the door is assembled. In an example embodiment, the doors may be trimmed within 12 minutes or less of exiting the press.

Various embodiments of the automated door manufacturing process and systems of the present invention may provide various advantages. Due to the mechanics of handling multiple doors at one time, current batch methods of door assembly do not easily allow for the implementation of a foam core or a fast-setting glue. Thus, using current batch assembly methods, there may be a downtime of about 30 minutes for pressing the doors, and of about 2 hours for the doors to cure after pressing. In an example embodiment, the processes and systems of the present invention may allow for production of high quality interior doors at a rate of 10 to 15 seconds per door by one assembly line. Thus, in one embodiment, the automated system of the present invention may reduce the total process time that it takes to produce a door by about three hours or more. For example, the automated methods and systems of the present invention may allow for production of 2,400 doors per shift (five doors per minute) or 7,200 doors per day, on one automated line by six workers. In one example embodiment, the automated system of the present invention may therefore allow for a reduction in labor of about 18%. Additionally, because many of the physical tasks may be performed by machines, workers may experience much less lifting and/or other physically demanding tasks.

It will be understood that each of the elements described above, or two or more together, may also find utility in applications differing from the types described. While the invention has been illustrated and described as method and systems for the automated manufacture of composite doors, and doors made by such methods and systems, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as described herein.

That which is claimed is:

1. A process for making doors comprising the following steps for the assembly of an individual door:
   (a) assembling a frame for the individual door, the frame comprising a pair of rails and a pair of stiles;
   (b) positioning and attaching the assembled frame and a first door skin;
   (c) positioning and attaching the assembled frame and a second door skin, wherein the process is substantially continuous, each of the steps (a)-(c) is substantially automated, and the doors are made substantially in tandem, such that the assembly of the individual door is substantially independent of the assembly of any other door and a first design of the individual door is varied from a second design of a previously assembled door; and
   (d) stacking the individual door on top of the previously assembled door prior to trimming both the individual door and the previously assembled door while stacked.

2. The process of claim 1, further comprising applying adhesive to at least one surface of the assembled frame.

3. The process of claim 2, further comprising the step of pressing the first door skin and the second door skin and the frame to facilitate adhesion of the door skins to the frame.

4. The process of claim 3, further comprising aligning the rails and stiles relative to each other using a robotic pick and place system.

5. The process of claim 4, further comprising applying the adhesive to at least one of the rails or stiles at each corner of the frame.

6. The process of claim 5, further comprising clamping the frame together using an adjustable clamp system.

7. The process of claim 4, wherein the adhesive sets in less than 5 minutes.

8. The process of claim 4, wherein the adhesive sets in about 10 to 90 seconds.

9. The process of claim 4, wherein the adhesive comprises a reactive hot-melt PUR adhesive.

10. The process of claim 1, further comprising positioning the frame on the first door skin using a robotic pick and place system.

11. The process of claim 1, further comprising positioning at least one lock block on the first door skin and within a perimeter of the assembled frame using a robotic pick and place system.

12. The process of claim 1, wherein the individual door is assembled in about 12 seconds or less.

13. The process of claim 1, further comprising applying an interior core material to the assembled frame.

14. The process of claim 13, wherein the core material comprises a polymer foam.

15. The process of claim 13, wherein the core material comprises an expandable mesh.

16. The process of claim 15, wherein the expandable mesh comprises a cellulosic material comprising a honeycomb structure.

17. The process of claim 13, wherein the core material comprises a solid material comprising at least one of a wood block, a particleboard, a corrugated cardboard, or a medium density fiberboard.

18. The process of claim 1, further comprising positioning the first door skin on the assembled frame.

19. The process of claim 1, wherein a first parameter of the individual door is varied from a second parameter of another individual door without interruption of the process.

20. The process of claim 19, wherein the first parameter comprises a specification.

21. A process for making doors comprising the following steps for the assembly of an individual door:
   (a) assembling a frame for the individual door, the frame comprising a pair of rails and a pair of stiles;
   (b) positioning and attaching the assembled frame and a first door skin;
   (c) positioning and attaching the assembled frame and a second door skin, wherein the process is substantially continuous, each of the steps (a)-(c) is substantially automated, and the doors are made substantially in tandem, such that the assembly of the individual door is substantially independent of the assembly of any other door and a first design of the individual door is varied from a second design of a previously assembled door; and
   (d) stacking the individual door on top of the previously assembled door and trimming both the individual door and the previously assembled door simultaneously.

22. The process of claim 21, further comprising applying adhesive to at least one surface of the assembled frame.

23. The process of claim 22, further comprising the step of pressing the first door skin and the second door skin and the frame to facilitate adhesion of the door skins to the frame.

24. The process of claim 23, further comprising aligning the rails and stiles relative to each other using a robotic pick and place system.

25. The process of claim 21, further comprising applying an interior core material to the assembled frame.

26. The process of claim 25, wherein the core material comprises a polymer foam.

* * * * *